Feb. 22, 1966  D. J. WERTHEIMER ETAL  3,236,998
COOKING APPARATUS
Filed May 31, 1962
2 Sheets-Sheet 1

INVENTOR.
DONALD J. WERTHEIMER
JOE A. GAUGER
RALPH A. HOLMES
BY Eugene M. Eckelman
ATTORNEY Feb. 22, 1966  D. J. WERTHEIMER ETAL  3,236,998
COOKING APPARATUS
Filed May 31, 1962  2 Sheets-Sheet 2
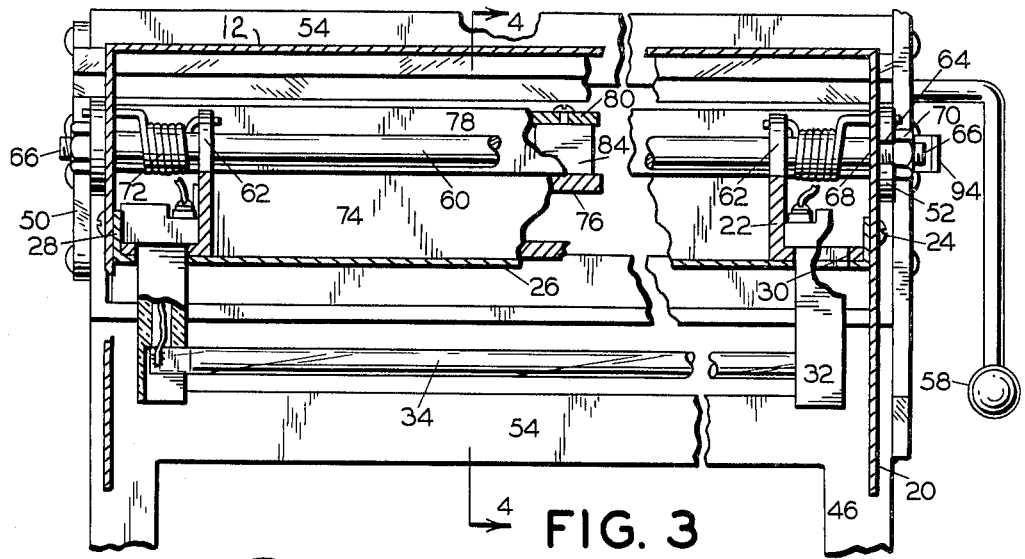
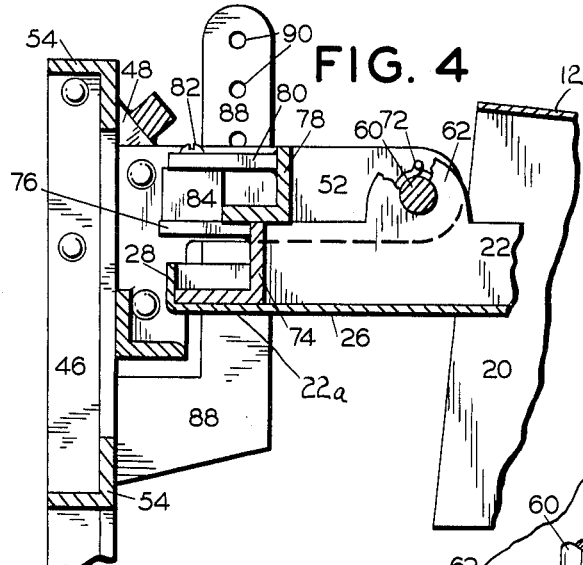
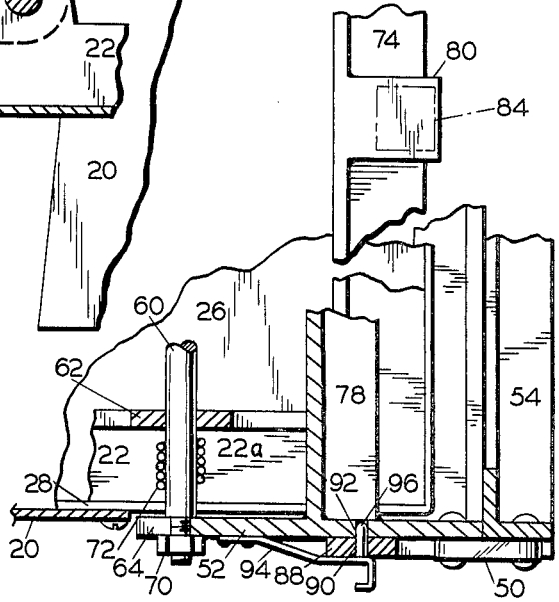
INVENTOR.
DONALD J. WERTHEIMER
JOE A. GAUGER
RALPH A. HOLMES
BY Eugene M. Eckelman
ATTORNEY

United States Patent Office 3,236,998
Patented Feb. 22, 1966

3,236,998
COOKING APPARATUS
Donald J. Wertheimer, 8645 SE. 36th Ave., and Joe A. Gauger, 11627 SE. Beckman Road, both of Milwaukie, Oreg., and Ralph A. Holmes, 11505 NE. Glisan, Portland, Oreg.
Filed May 31, 1962, Ser. No. 199,142
1 Claim. (Cl. 219—524)

This invention relates to a new and novel method of cooking and to apparatus for accomplishing the same.

A primary object of the present invention is to provide a method of cooking which comprises the simultaneous heat treating of articles to be cooked by a lower supporting heating grill and an upwardly spaced source of infrared radiant heat.

It is another object to provide apparatus for carrying out the above method.

Still another object is to provide cooking apparatus having a lower heating element which is adapted to heat material by conduction and an upper heating element adapted to heat by infra-red radiation.

Yet another object is to provide a cooking apparatus of the type described which employs a pivoted upper cooking unit supported in a novel manner wherein it is adapted to be moved away from the lower cooking unit when desired and when so moved causes its heating elements to be shut off, and which is adjustable with its pivot in a vertical direction whereby to be pivotally operative in variable horizontal planes relative to the lower cooking unit.

The manner in which the foregoing and other objects of the invention are accomplished will be apparent from the accompanying specification and claim considered together with the drawings, wherein:

FIG. 3 is a fragmentary sectional view, slightly enlarged, taken on the line 3—3 of FIG. 1;

FIG. 4 is a fragmentary sectional view taken on the line 4—4 of FIG. 3;

FIG. 5 is a fragmentary sectional view taken on the line 5—5 of FIG. 1; and

FIG. 6 is a wiring diagram showing electrical components of the upper cooking unit.

Figure 1:
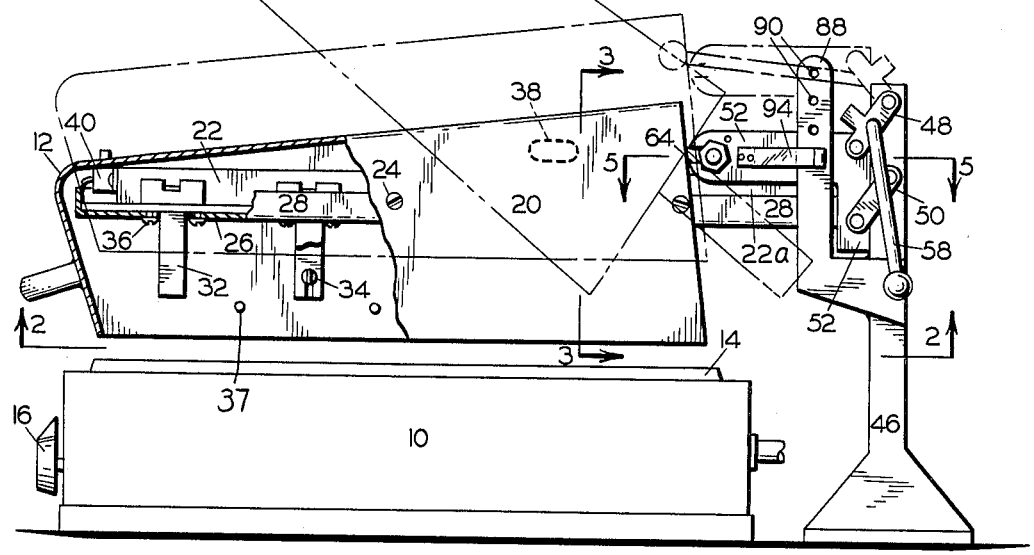
FIG. 1 is a side elevational view of the present cooking apparatus with parts thereof broken away.
Figure 2:
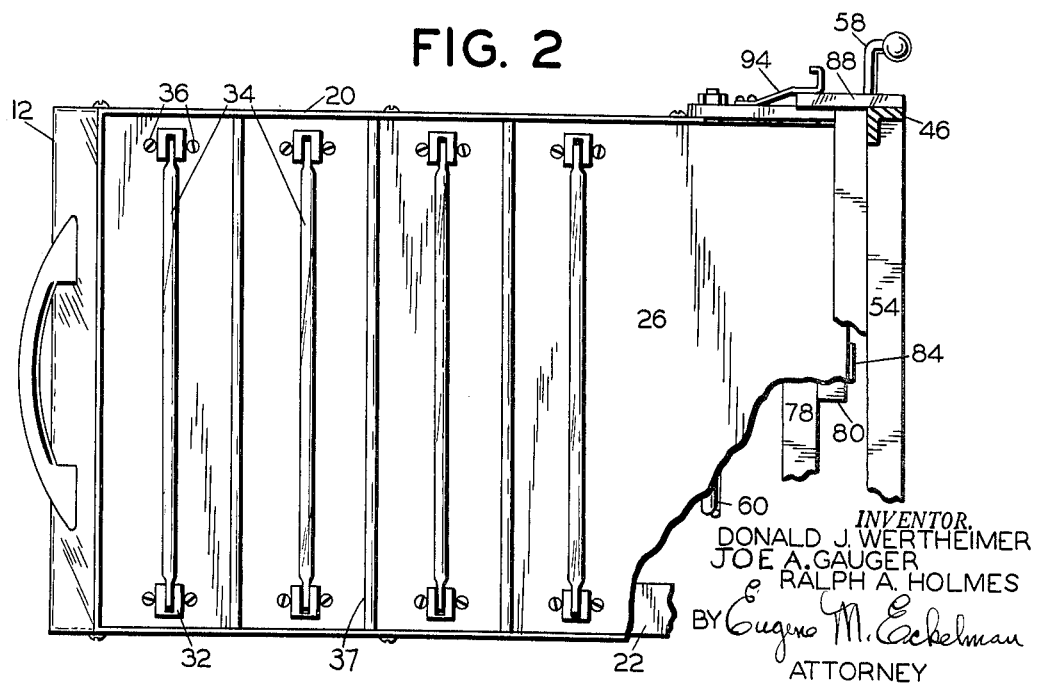
FIG. 2 is a bottom plan view of an upper cooking unit of the apparatus, taken on the line 2—2 of FIG. 1.

Referring now particularly to the drawings and first to FIGS. 1 and 2, the present cooking apparatus comprises broadly a lower cooking unit 10 and an upper cooking unit 12. The lower unit 10 is in the form of a conventional grill which cooks by conduction and which may be heated by electricity, gas, or the like. This unit has a grill surface 14 for supporting articles to be cooked, and has the usual temperature control knob 16.

The upper cooking unit 12 comprises a housing or shell 20 which is open at the bottom and back. Housing 20 is secured to an inner channel-shaped frame 22, also seen in FIGS. 3, 4 and 5, by screws 24. Also secured in a horizontal position against the undersurface of frame 22 is a reflecting plate 26, said plate having end flanges 28, FIG. 3, for engagement by the screws 24.

Frame 22 has a plurality of bottom openings 30, best seen in FIG. 3, for the reception of holders 32 for infra-red heating elements 34, said holders being securely affixed to the frame 22 by means of screws 36, FIG. 1. Cross bars 37 are mounted intermediate the sides of housing 20 and are disposed slightly below the holders 32. These bars serve to protect the heating elements and holders against accidental damage.

As best seen in FIG. 2, a plurality of the heating elements 34 are provided, said heating elements being spaced and being of a designated wattage to produce preferred cooking results. Furthermore, spacing and wattage are preselected such that even cooking of an article on the grill surface is accomplished, the even distribution of heat from the infra-red units being assisted by the reflecting plate 26. This plate also serves to keep the upper portion of the housing 20 from overheating.

It has been found that by combining a conventional cooking grill 10 as a lower cooking unit and an infra-red unit as the upper cooking unit, that meat, for example, can be cooked in a very short time and because it is cooked fast, it retains its juices and flavor. This is accomplished by a combination of cooking by the grill 14 which serves to cook the meat in its own juices and the rapid cooking by the infra-red heating units. Thus, meat cooked on the present cooking apparatus is more tasty than when cooked on conventional apparatus and can be cooked much faster.

FIG. 6 illustrates the wiring diagram for the electrical components of the upper cooking unit 12, comprising cooking elements 34 connected in parallel and having in their feed line circuit a mercury switch 38 which is arranged to close the circuit to the elements when the upper unit is in a horizontal cooking position but to open the circuit to the cooking elements 34 when the unit 12 is raised. The mercury switch 38 may be located in any suitable position on the top unit 12, and as apparent in FIG. 1 is secured to the side of the housing 20. A manual on-off switch 40 is included in the feed line circuit, and a pilot light 42 is connected in the circuit of the mercury switch whereby to be lighted in the closed condition of the latter.

Means are provided for supporting the upper cooking unit 12 directly over the lower cooking unit 10, such means comprising a pair of standards 46 securely attached to a base surface and pivotally supporting at their upper end upper and lower links 48 and 50, respectively, the lower end of the links 48, 50 being pivotally attached to side bars 52. A pair of the links 48 and 50 and a side bar 52 are provided at each side, and furthermore suitable cross reinforcing angle irons 54 are provided to secure the standards integrally together. The upper link 48 is provided with an integral crank handle 58 which, as will be seen hereinafter, is utilized to raise and lower the side bars 52.

The upper cooking unit 12 is pivotally supported on the side bars 52 by means of a shaft 60 mounted in apertured ears 62 forming an integral part of channels 22 and having its ends engaged in bars 52. In a preferred arrangement, the ends of the side bars 52 are slotted at 64, FIG. 1, and receive reduced threaded end portions 66 of the shaft, the reduced threaded portions forming end shoulders 68 against which bars 52 are secured integrally to the shaft by means of clamp nuts 70. Thus, the shaft is fixed securely to the bars 52 in a non-rotative position and the upper cooking unit 12 is rotatable on the shaft.

Mounted on the shaft 60 at opposite ends thereof are torsion springs 72, FIGS. 3 and 5, having one end anchored in the ears 62 and the opposite end anchored in the bars 52. The springs 72 are preferably of sufficient strength to pivot the cooking unit 12 upwardly from its horizontal cooking position to its upwardly inclined rest position, or at least strong enough to assist greatly in upward rotation of the unit 12.

It is preferred to provide positive hold-down means for maintaining the unit 12 in its horizontal cooking position, and for this purpose the frame member 22 has rear extensions 22a. These extensions are interconnected across their projecting end by a rearwardly facing angle iron 74, FIGS. 4 and 5. Forming an integral part of angle iron 74 is a rearwardly extending tab 76 which is located substantially centrally across the frame. Secured integrally between the side bars 52 is a rearwardly facing angle iron 78 having a rearwardly extending tab 80 to which is secured by screws 82 a magnet 84, the tab 80 and magnet 84 being positioned for engagement by the tab 76. The parts are constructed and arranged such that when the upper cooking unit is disposed in a horizontal cooking position, the tab 76 is in engagement with magnet 84 and thus positively holds said cooking unit in its horizontal position. When it is desired to raise the cooking unit 12, the latter must be pivoted on the shaft 60 sufficiently to break the contact between tab 76 and magnet 84.

Thus, it will be apparent that the upper cooking unit 12 is pivotal between a horizontal cooking position and an upwardly inclined rest position, and in addition, the horizontal cooking plane thereof is adjustable through the medium of links 48, 50 through which the side bars 52 are vertically adjustable. For the purpose of locking the upper cooking unit in selected vertical spacings from the lower unit, one of the standards 46 has an upwardly extending, forwardly offset arm 88 provided with a plurality of vertically spaced apertures 90. The associated bar 52 has one or more apertures 92, FIG. 5, adapted to register with apertures 90 in the arm 88 upon pivoted movement of bar 52 on links 48, 50. The associated side bar 52 carries a latch finger 94 having a projection 96 of a length to project through one of apertures 90 in arm 88 and engage one of apertures 92 in bar 52. Thus, the horizontal cooking position of the upper cooking unit 12 relative to the lower unit is adjusted according to the vertically latched position of the side bars 52 on the arms 88, such a vertical positioning prior to latching of the upper cooking unit being readily accomplished by operation of crank handle 58.

In accordance with the present invention, there is thus provided apparatus for the cooking of articles which speeds cooking time and also improves the cooking flavor. Furthermore, the apparatus has adjustable means for selected spacing of two cooking units to accommodate various thicknesses of articles to be cooked and to vary cooking time. The wattage of the upper and lower elements may vary according to the general thickness of articles to be cooked and according to the speed of cooking desired. The infra-red heating elements are preferably of high or intense wattage to produce intense heating and are presently known in the trade as quartz elements.

It is to be understood that the invention may take other forms than that shown and that all such modifications and variations within the scope of the appended claim which will occur to persons skilled in the art are included in the invention.

Having thus described our invention, we claim:

A cooking apparatus comprising lower and upper cooking units, the lower cooking unit comprising a grill having an upper heating surface for supporting articles to be cooked, a pair of upright standards arranged for support adjacent said lower cooking unit, a pair of side bars, link means pivotally connecting said side bars and said standards and arranged to move said side bars vertically relative to said standards, means pivotally mounting said upper cooking unit on said side bars, whereby said upper cooking unit is movable vertically as well as pivotally relative to said lower cooking unit for disposition in lowered cooking position and an upper non-cooking position, means on said side bars engageable by said upper cooking unit to hold the latter in the lower pivoted position thereof substantially parallel with the lower cooking unit, vertical adjustment means operatively connected between one of said standards and one of said side bars for supporting the side bars and upper cooking unit a selected vertical distance from the lower cooking unit, said upper cooking unit having upper and lower portions, electric infra-red cooking elements mounted on the lower portion of said upper cooking unit and arranged to assist in cooking articles on said grill surface by infra-red radiation, said infra-red cooking elements being disposed in spaced relation and extending throughout a greater portion of said upper cooking unit and comprising solely the cooking element of said upper cooking unit, and electric circuit means for said infra-red cooking unit.

References Cited by the Examiner

UNITED STATES PATENTS

| 2,057,421 | 10/1936 | Dickson | 219—479 X |
| 2,138,813 | 12/1938 | Bemis | 99—352 |
| 2,199,584 | 5/1940 | Bemis | 99—107 |
| 2,529,253 | 11/1950 | Hoffman et al. | 99—386 |
| 2,584,584 | 2/1952 | Hoffman et al. | 99—187 |
| 2,708,708 | 5/1955 | Ronsch | 219—392 |
| 2,894,107 | 7/1959 | Lefebvre | 219—538 X |
| 3,014,114 | 12/1961 | Merklein | 219—477 |

FOREIGN PATENTS

| 336,915 | 4/1959 | Switzerland. |

ANTHONY BARTIS, *Acting Primary Examiner.*

RICHARD M. WOOD, HYMAN LORD, *Examiners.*